US012012787B2

(12) United States Patent
Lee

(10) Patent No.: US 12,012,787 B2
(45) Date of Patent: Jun. 18, 2024

(54) TAILGATE SWITCHING DEVICE

(71) Applicant: LS AUTOMOTIVE TECHNOLOGIES CO., LTD., Anyang-si (KR)

(72) Inventor: Jae Chul Lee, Siheung-si (KR)

(73) Assignee: LS AUTOMOTIVE TECHNOLOGIES CO., LTD., Anyang-si (KR)

( * ) Notice: Subject to any disclaimer, the term of this patent is extended or adjusted under 35 U.S.C. 154(b) by 835 days.

(21) Appl. No.: 16/999,800

(22) Filed: Aug. 21, 2020

(65) Prior Publication Data

US 2021/0054667 A1 Feb. 25, 2021

(30) Foreign Application Priority Data

Aug. 22, 2019 (KR) ........................ 10-2019-0102788

(51) Int. Cl.
*E05B 83/18* (2014.01)
*E05B 81/04* (2014.01)

(52) U.S. Cl.
CPC .............. *E05B 83/18* (2013.01); *E05B 81/05* (2013.01); *E05Y 2900/546* (2013.01)

(58) Field of Classification Search
CPC .... E05B 83/18; E05B 81/05; E05B 2009/047; E05Y 2900/546; H01H 2009/048; H01H 2217/01; H01H 9/04; H01H 13/06; H01H 27/06; H01H 19/563; B60R 16/005
USPC ........................................................... 296/50
See application file for complete search history.

(56) References Cited

U.S. PATENT DOCUMENTS

| | | | | |
|---|---|---|---|---|
| 7,178,823 | B1 * | 2/2007 | Tai | B62K 27/12 280/656 |
| 9,923,294 | B1 * | 3/2018 | Maranville | H01R 13/08 |
| 10,458,173 | B2 * | 10/2019 | Fukui | E05F 15/63 |
| 10,814,703 | B2 * | 10/2020 | Jung | F21S 43/14 |
| 2022/0328261 | A1 * | 10/2022 | Buschmann | G05G 25/00 |

FOREIGN PATENT DOCUMENTS

| | | | | |
|---|---|---|---|---|
| DE | 102009033486 A1 * | 4/2010 | | E05B 81/76 |
| KR | 1030972 B1 * | 4/2011 | | |
| KR | 101030972 B1 | 4/2011 | | |

* cited by examiner

*Primary Examiner* — Pinel E Romain
(74) *Attorney, Agent, or Firm* — Rabin & Berdo, P.C.

(57) ABSTRACT

The present invention provides a tailgate switching device comprising: a housing (100) configured to at least partially allow a flexible operation; a substrate (200) disposed within the housing (100); a switching unit (300) including a switching terminal (330) configured to be at least partially movable within the housing (100) through at least partial pressing of the housing (100) and at least partially disposed on the substrate unit (200) to cause a signal change to occur through the relative movement between the switching terminal (330) and the housing (100)/the substrate unit (200); and a cable (400) directly connected at one end thereof to the substrate unit (200) and connected at the other end thereof to the outside of the housing (100).

16 Claims, 10 Drawing Sheets

TAILGATE SWITCHING DEVICE

CROSS-REFERENCE TO RELATED APPLICATIONS

This application claims the benefit of Korean Patent Application No. KR 10-2019-0102788, filed on Aug. 22, 2019 in the Korean Intellectual Property Office, which is incorporated herein by reference in its entirety.

BACKGROUND OF THE INVENTION

1. Field of the Invention

The present invention relates to a switch mounted on a vehicle. More specifically, the present invention relates to a vehicular switch with a simple and compact structure, which can effect the locking/unlocking of a trunk lid or a tailgate and improve watertightness.

2. Description of Related Art

A vehicle such as an automobile is required to be provided with functions of various kinds of convenient means for offering a more stable and comfortable driving state to a user, beyond a function of the vehicle as a means of transportation. Thus, the vehicle is equipped with various convenient facilities, and a variety of kinds of switches for operating and controlling them.

A trunk of the vehicle is a compartment of providing a loading space that is formed at the rear of a vehicle body to load luggage therein. Such a trunk has a structure that allows a trunk lid to open or close the loading space. Typically, the trunk lid can be configured so to be locked by a locking means including a latch.

However, a conventional switch for effecting the locking/unlocking of the trunk lid entails a problem in that an erroneous operation occurs or durability is deteriorated due to the introduction of moisture or water or foreign substances thereinto.

In addition, the conventional trunk lid switch involves a problem in that it adopts a method of connecting a connecting signal line for transferring a switching signal through soldering, resulting in a remarkable decrease in assemblability.

SUMMARY OF THE INVENTION

The present invention has been made to solve the above-mentioned problems associated with the prior art, and it is an object of the present invention to provide a tailgate switching device with a simple and compact structure, which can enhance assemblability, and improve watertightness and durability of manipulation, and a switch device including the same.

To achieve the above objects, the present invention provides a tailgate switching device including: a housing 100 configured to at least partially allow a flexible operation; a substrate 200 disposed within the housing 100; a switching unit 300 including a switching terminal 330 configured to be at least partially movable within the housing 100 through at least partial pressing of the housing 100 and at least partially disposed on the substrate unit 200 to cause a signal change to occur through the relative movement between the switching terminal 330 and the housing 100/the substrate unit 200; and a cable 400 directly connected at one end thereof to the substrate unit 200 and connected at the other end thereof to the outside of the housing 100.

In the tailgate switching device, the substrate unit 200 may include: a substrate 210 disposed within the housing 100; and a substrate pin 220 disposed perpendicular to the substrate 210 in such a manner as to pass, at one end thereof, through the housing 100, and the cable 400 may include a cable connector 410 mounted at one end thereof so as to be connectable to one end of the substrate pin 220.

In the tailgate switching device, the substrate pin 220 may include: a pin base 223 connected to the substrate 210; a pin holder 221 configured to support the pin base 223 on one surface of the substrate 210; and a pin terminal 225 disposed spaced apart from the pin base 223 with the pin holder 221 interposed between the pin base 223 and the pin terminal 225.

In the tailgate switching device, the housing 100 may include: a housing body 120 including a through-opening 122 at least partially penetratingly formed at the center thereof; a housing base 130 engaged with the housing body 120 to define an internal space between the housing body 120 and the housing base 130; and a housing cover 110 made of a flexible material and disposed on the outer surface of the housing body 120 to hermetically seal the through-opening 122 of the housing body 120.

In the tailgate switching device, the housing cover 110 may be disposed to surround a front surface of the housing body 120.

In the tailgate switching device, the housing cover 110 may be disposed to at least partially surround one surface of the housing body plate 121 in such a manner as to include the through-opening 122 of the housing body 120.

In the tailgate switching device, the switching unit 300 may include: a switching moving block 310 disposed in the internal space of the housing body 120 in such a manner as to be contactable with an inner surface of the housing cover 110; a switching rubber pad 320 disposed between the switching moving block 310 and the substrate 210; and a switching terminal 330 partially disposed on one surface of the switching rubber pad 320, which is oriented toward the substrate 210, and partially disposed correspondingly so as to be contactable with the substrate 210.

In the tailgate switching device, the switching terminal 330 may include: a movable terminal 331 disposed on the switching rubber pad 320; and a stationary terminal 333 disposed on the substrate 210 so as to be contactable with the movable terminal 331.

In the tailgate switching device, the switching rubber pad 320 may include: a pad base 321 disposed between the switching moving block 310 and the substrate 210; and a pad moving part 323 configured to be contactable with the switching moving block 310.

In the tailgate switching device, the housing body 120 may include a housing body damper 127 formed to surround the through-opening 122 and to be protruded toward the switching rubber pad 320. In the tailgate switching device, the housing body damper 127 may be included within a surface area of the pad base 321 when projected onto the pad base 321.

In the tailgate switching device, the switching moving block 310 may further include one or more switching moving block guides 311 formed on the outer peripheral surface thereof, and the housing body 120 may further include one or more housing body guides 129 formed on the inner peripheral surface thereof to correspond the positions of the switching moving block guides 311 so that the switching moving block guides 311 and the housing body guides 129 are movably engaged with each other.

In the tailgate switching device, the switching moving block 310 may further include one or more switching moving block assembly guides 316 formed on one side of the outer peripheral surface thereof, and the housing body 120 may further include one or more housing body assembly guides 126 formed on one side of the inner peripheral surface thereof to correspond to the positions of the switching moving block assembly guides 316 so that the switching moving block assembly guides 316 and the housing body assembly guides 126 are engaged with each other. In addition, the switching moving block assembly guides 316 and the housing body assembly guides 126 may form an asymmetrical arrangement structure in which they are not engaged with each other when one of them is arranged in a stated of being reversed by 180 degrees.

In the tailgate switching device, the substrate 210 may include a substrate mounting part 211 formed therein, and the housing base 130 may include a housing base engagement part 133 formed therein so as to be engageable with the substrate mounting part 211.

Effects of the Invention

The tailgate switching device according to the present invention as constructed above has the following effects.

First, the tailgate switching device of the present invention can enhance durability through a structure with improved watertightness of the inside thereof while improving manipulability through the housing cover made of a flexible material.

Second, the tailgate switching device of the present invention can implement a structure of improving an assembly process between the substrate unit and the cable through the substrate pin of the substrate unit, thereby improving assembly convenience, reliability and durability.

Third, the tailgate switching device of the present invention can implement a structure of improving watertightness at the inside of the housing body to enhance a pressurized watertight state between the housing body and the switching rubber pad, thereby preventing the introduction of foreign substances or moisture into the tailgate switching device, and thus improving durability of the device.

Although the present invention has been described centering on a case where the tailgate switching device of the present invention is disposed on a window switch device of a vehicle, it will be apparent to those skilled in the art that the tailgate switching device can be applied to the implementation of various switching functions of a vehicle or a system other than the vehicle within a range of implementing a push operation.

BRIEF DESCRIPTION OF THE DRAWINGS

The above and other objects, features and advantages of the present invention will be apparent from the following detailed description of the preferred embodiments of the invention in conjunction with the accompanying drawings, in which.

EXPLANATION ON SYMBOLS

Figure 1:
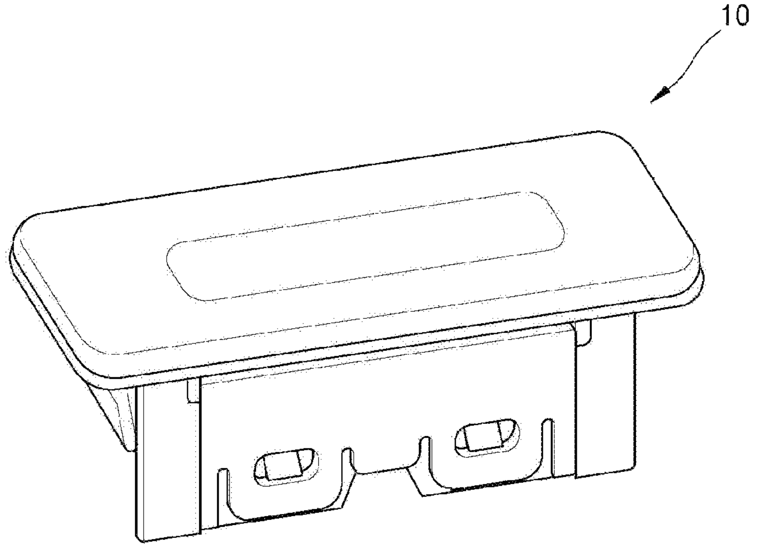
FIG. 1 is a schematic perspective view illustrating a tailgate switching device according to an embodiment of the present invention.
Figure 2:
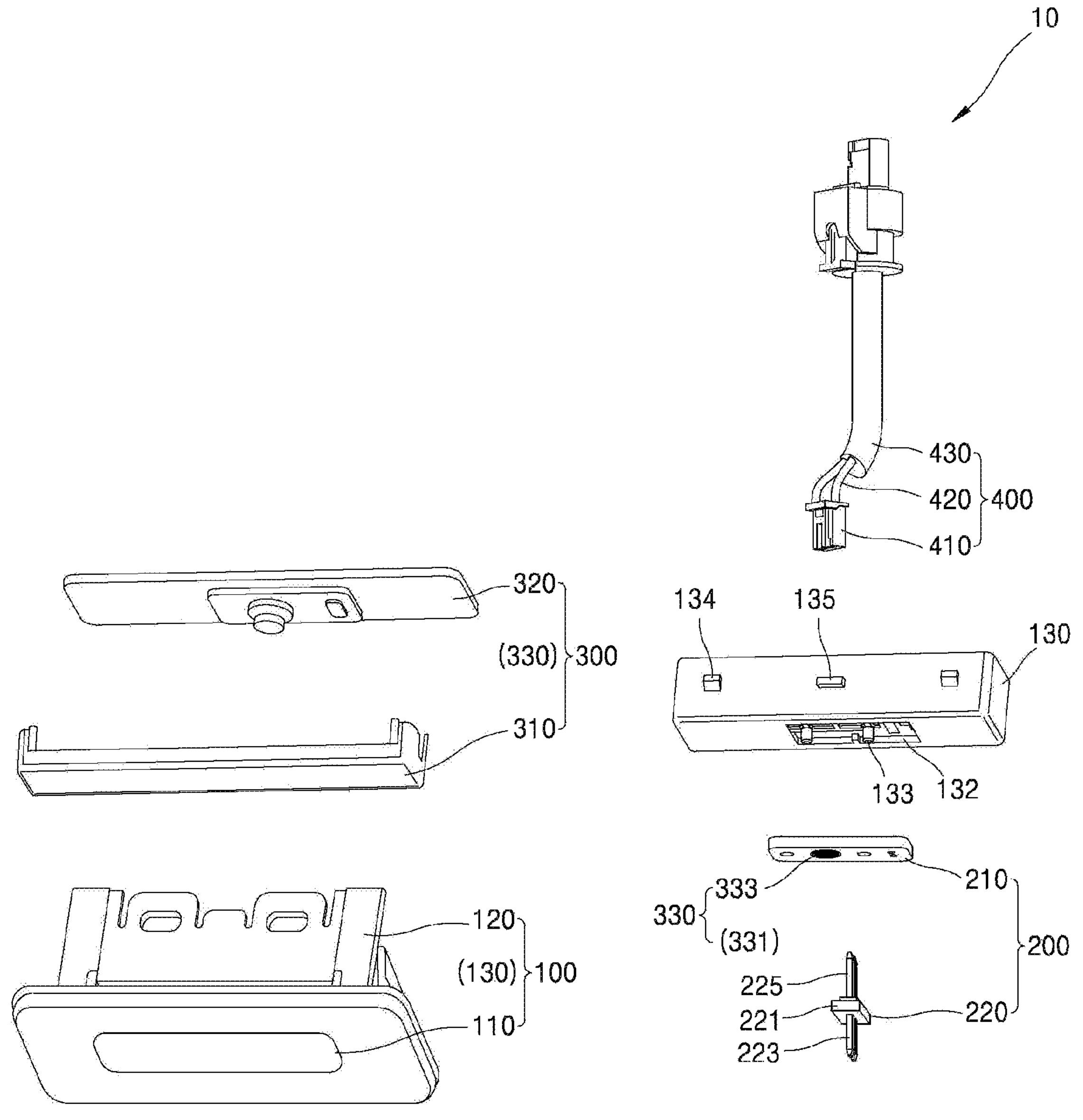
FIG. 2 is a schematic exploded perspective view illustrating a tailgate switching device according to an embodiment of the present invention.
Figure 3:
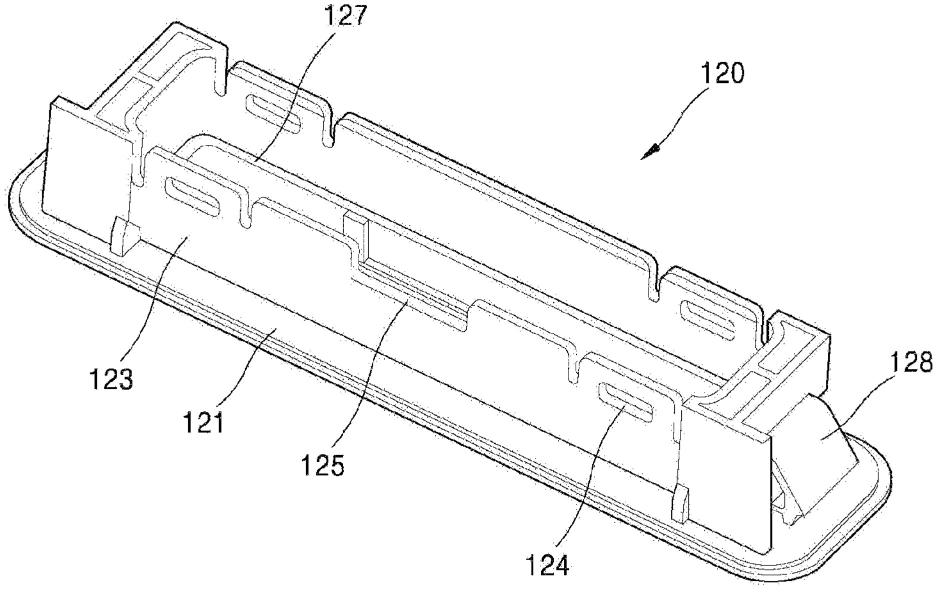
FIGS. 3 and 4 illustrate schematic perspective and top plan views, respectively, of a tailgate switching device according to an embodiment of the present invention.

| | |
|---|---|
| 10: tailgate switching device | |
| 100: housing | 200: substrate unit |
| 300: switching unit | 400: cable |

DESCRIPTION OF THE PREFERRED EMBODIMENTS

Now, a tailgate switching device according to the preferred embodiments of the present invention will be described hereinafter in detail with reference to the accompanying drawings. It should be noted that the same elements in the drawings are denoted by the same reference numerals although shown in different figures. In the following description, the detailed description on known function and constructions unnecessarily obscuring the subject matter of the present invention will be avoided hereinafter.

A tailgate switching device 10 according to an embodiment of the present invention includes a housing 100, a substrate unit 200, a switching unit 300, and a cable 400. First, the housing 100 is implemented as a structure of at least partially allowing a flexible operation, and defines an internal space for accommodating other constituent elements.

The housing 100 according to an embodiment of the present invention includes a housing body 120, a housing base 130, and a housing cover 110.

First, the housing body 120 is implemented as a box-shaped structure. The housing body 120 includes a housing mounting part 128 disposed on an outer periphery thereof. The housing mounting part 128 has a structure in which it is positionally fixed to a lower end side of a trunk lid of a vehicle. The housing body 120 includes a through-opening 122 at least partially penetratingly formed at the center thereof. The through-opening 122 is implemented as a through-opening for allowing a user to transfer a moving force therethrough to pressingly move a constituent element which will be described later. The housing body 120 may include a housing body damper 127 formed on the inner surface thereof so as to delimit the through-opening 122. The housing body damper 127 is a constituent element that is protrudingly formed toward a switching rubber pad 320 which will be described later so as to surround the through-opening 122 of the housing body 230 as will be described later.

The housing body 120 includes a housing body plate 121 and a housing body block 123. The housing body block 123 is integrally formed with the housing body plate 121 in such a manner as to be connected to an end of the housing body plate 121. The through-opening 122 is formed to penetrate through the housing body plate 121 and the housing body block 123.

The housing body block 123 has a pair of opposed housing body engagement parts 124 formed at each of both opposed ends thereof so that housing base engagement parts 134 formed on each of both opposed walls of the housing base 130 can be engagedly fastened to the opposed housing body engagement parts 124 to strengthen the engagement between the housing body 120 and the housing base 130.

The housing body 120 includes a housing body rib formed on the outer periphery thereof so that a predetermined body support structure and rigidity can be provided.

The housing base 130 is engaged with the housing body 120 to define an internal space between the housing body 120 and the housing base 130. The housing base 130 is connected to a rear surface of the housing body 120, and a connector mounting part 131 is disposed at the housing base 130 so that the cable 400 can be connected to the housing base 130 through the connector mounting part 131.

The housing body block 123 may further include a constituent element configured to prevent an erroneous assembly between the housing body 120 and the housing base 130. In other words, the housing body block 123 includes a housing body conformation 125 formed at an upper end thereof, which is oriented toward the housing base 130, and the housing base 130 includes a housing base conformation 135 formed on the outer surface thereof so as to correspond to the position of the housing body conformation 125.

The housing body conformation 125 and the housing base conformation 135 are disposed at positions where they are engaged with each other, but the housing body conformation 125 and the housing base conformation 135 form a structure in which they are disposed only on one sides thereof or disposed asymmetrically so that when the housing body 120 and the housing base 130 are engaged with each other in a stated of being reversed by 180 degrees on a plane where they are disposed to be engaged with each other, the mutual engagement therebetween can be prevented to further enhance assemblability.

The housing cover 110 is made of a flexible material and is disposed on the outer surface of the housing body 120. The housing cover 110 servers to hermetically seal the through-opening 122 of the housing body 120. The housing cover 110 is formed of a flexible material so that when a user such as a driver or the like presses the housing cover 110, it can have a structure of transferring a moving force to a switching moving block 310 of the switching unit 300, and is configured to return to its original position by a restoring force after a pressing force applied to the switching moving block 310 has been removed. In this embodiment, the flexible material used in forming the housing cover 110 may include a thermoplastic polyurethane (TPU) resin.

The housing cover 110 according to an embodiment of the present invention as shown in FIG. 1 has a structure in which it completely covers one surface of the housing body plate 121 of the housing body 120. The housing cover 110 may be disposed to surround a front surface of the housing body 120 (see FIG. 1). In the case of such a configuration, the housing cover 110 completely covers the through-opening 122 formed in the housing body plate 121 and an outer periphery region of the through-opening 122 to improve airtightness or watertightness so that water can be prevented from flowing or infiltrating into the internal space defined between the housing body 120 and the housing base 130.

In some embodiments, the housing cover 110 may have a structure of partially, but not completely, covering one surface of the housing body plate 121 (see FIGS. 13 to 16). The housing cover 110 may be disposed to at least partially surround one surface of the housing body plate 121 in such a manner as to include the through-opening 122 of the housing body 120. In other words, the housing body plate 121 includes a plate stepped portion 128 formed at an outer periphery of the through-opening 122 on one surface thereof.

The plate stepped portion 128 has a structure of surrounding the through-opening 122. In this case, the housing cover 110 includes a cover central portion 111 and a cover peripheral portion 113. The cover peripheral portion 113 has a structure of surrounding the cover central portion 111 in such a manner as to be connected integrally with the cover central portion 111. The cover peripheral portion 113 may have a structure in which it is brought into close contacts with the plate stepped portion 128 so that water (W) can be prevented from being introduced into the housing body 120 through a gap space defined between the cover peripheral portion 113 and the plate stepped portion 128.

The substrate unit 200 is disposed within the housing 100. The substrate unit 200 includes a substrate 210 and a substrate pin 220. The substrate 210 is disposed within the housing 100. The substrate 210 allows a switching terminal 330 of a switching unit 300, which performs a switching operation, to be at least partially disposed thereon, and transmits or receives an electrical signal to or from an external device (not shown) through a circuit wiring. The substrate 210 includes a substrate mounting part 211 formed therein, and the housing base 130 includes a housing base seating part 132 formed on one surface thereof so as to be oriented toward the substrate 210 so that a housing base engagement part 133 is disposed at the housing base seating part 132 of the housing base 130 to correspond to the position of the substrate mounting part 211 so as to be engageable with the substrate mounting part 211. The substrate 210 may be disposed on the housing base seating part 132 in such a manner that the base engagement part 133 is penetratingly inserted into the substrate mounting part 211 to maintain the substrate 210 in a position fixed state.

The substrate pin 220 is disposed perpendicular to the substrate 210. The substrate pin 220 is transmits or receives an electrical signal to or from an external device (not shown) connected to the substrate 210. The substrate 210 has a pin through-hole 213 formed therein to allow one end of the substrate pin 220 to be fittingly mounted therein. In this embodiment, the pin through-hole 213 is provided in plural numbers, respectively.

The substrate pin 220 is disposed to pass, at one end thereof, through the housing 100 so that a housing base connector 131 formed at the housing base 130 is positioned on the substrate pin 220. The housing base connector 131 is connected to the cable 400 and the substrate pin 220 forms a structure in which it passes through the housing base connector 131 so as to be connected to the cable 400.

The cable 400 has a structure in which it is directly connected at one end thereof to the substrate unit 200 and connected at the other end thereof to the outside of the housing 100. The cable 400 includes a cable connector 410, a cable line 420, and a cable tube 430. The cable connector 410 is formed at one end of the cable 400 so as to be connectable to one end of the substrate pin 220. In other words, the connector mounting part 131 is disposed at the housing base 130 so that one end of the cable connector 410 of the cable 400 is connected to the connector mounting part 131. Another connector is disposed at the other end of the cable connector 410 to form a structure of being connected to an external device. By virtue of this structure in which the substrate pin 220 is connected to the cable connector 410 through the connector mounting part of the housing base 130, assemblability and watertightness can be ensured, and thus an assembly process can be more facilitated to further enhance manufacturability.

The cable line 420 allows an electrical signal to be transmitted to the substrate unit 200 and the external device therethrough, and the cable tube 430 is disposed around the cable line 420 so that watertightness and electrical insulatability can be ensured.

The substrate pin 220 includes a pin base 223, a pin holder 221, and a pin terminal 225.

The pin base 223 is connected to the substrate 210, and is insertingly disposed into the pin through-hole 213 of the substrate 210.

The pin holder 221 supports the pin base 223 on one surface of the substrate 210, and the pin terminal 225 is disposed spaced apart from the pin base 223 with the pin holder 221 interposed between the pin holder 221 and the pin terminal 225. The pin terminal 225 is disposed to penetrate through the housing base connector 131 so as to maintain an electrical connection state with the cable connector 410.

The switching unit 300 includes a switching terminal 330 that is at least partially movable within the housing 100 through at least partial pressing of the housing 100 and is at least partially disposed on the substrate unit 200 to cause a signal change to occur through the relative movement between the switching terminal 330 and the housing 100/the substrate unit 200.

More specifically, the switching unit 300 includes a switching moving block 310, a switching rubber pad 320, and a switching terminal 330.

The switching moving block 310 is disposed in the internal space of the housing body 120 in such a manner as to be contactable with an inner surface of the housing cover 110. The switching moving block 310 forms a rectangular-parallelepiped block structure in this embodiment. The shape of the switching moving block 310 can be modified in various manners. One side of the switching moving block 310, which confronts the housing cover 110, preferably has a flat structure.

A switching moving block-moving part 317 is disposed on a rear surface of the switching moving block 310 so that the block-moving part 317 can transfer a pressing force to a part of the switching terminal 330 which will be described later to cause the moving state of the switching terminal 330 to be changed. The switching moving block 310 includes a rib 313 formed at the inside thereof so that it can implement a structure of enhancing rigidity while minimizing the weight thereof.

The switching moving block 310 is moved together with the housing cover 110 through the pressing operation of the housing cover 110. The switching moving block 310 may further include a constituent element configured to guide the movable movement of the switching moving block 310. In other words, the switching moving block 310 further includes a plurality of switching moving block guides 311 formed on the outer peripheral surface thereof, and the housing body 120 further includes a plurality of housing body guides 129 formed on the inner peripheral surface thereof to correspond to the positions of the switching moving block guides 311 so that the switching moving block guide 311 and the housing body guides 129 can form a mutually movable engagement structure to maintain a stable moving state of the switching moving block 310.

Figure 4:
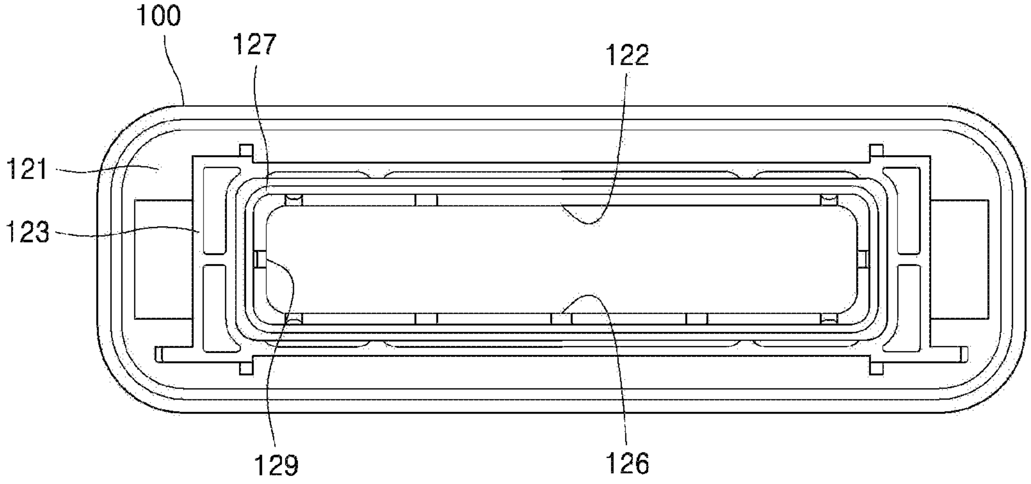
Figure 5:
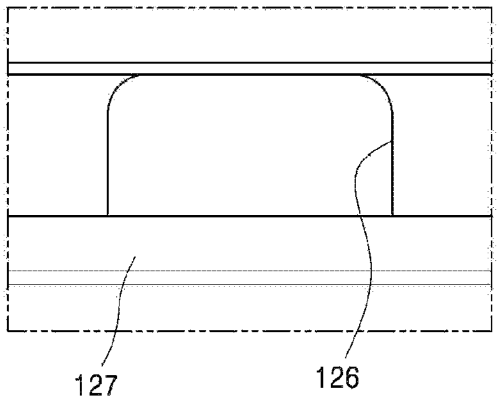
FIG. 5 is a schematic partial enlarged top plan view illustrating a housing body of a tailgate switching device according to an embodiment of the present invention.
Figure 6:
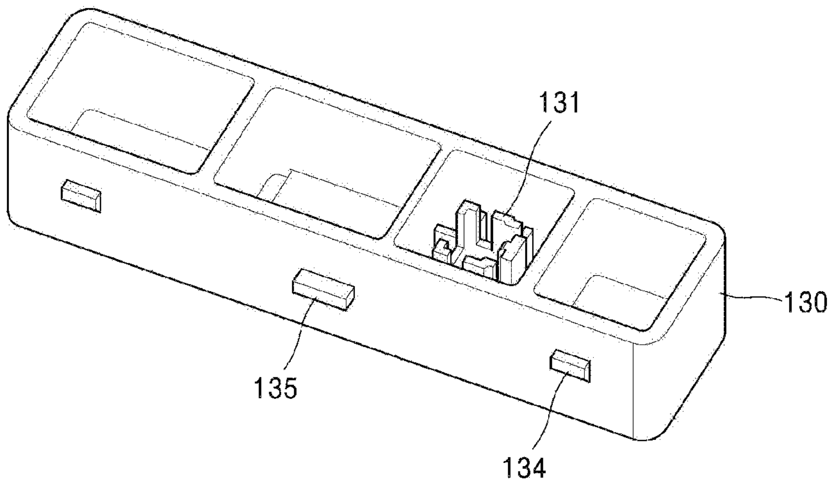
FIG. 6 is a schematic perspective view illustrating a housing base of a tailgate switching device according to an embodiment of the present invention.
Figure 7:
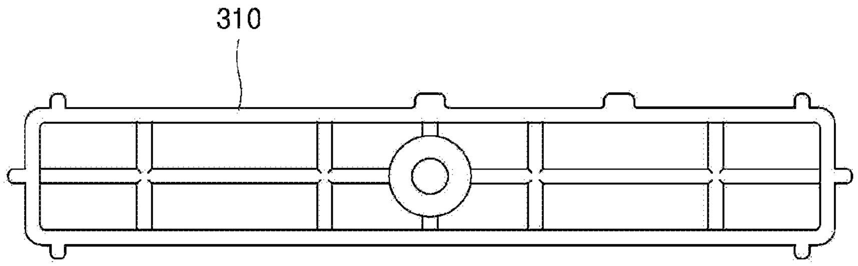
FIG. 7 is a schematic top plan view illustrating a switching moving block of a switching unit of a tailgate switching device according to an embodiment of the present invention.
Figure 8:
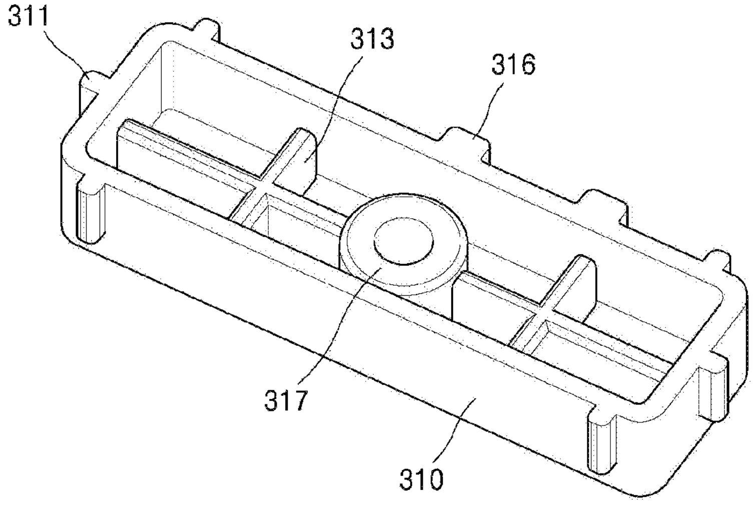
FIG. 8 is a schematic perspective view illustrating a switching moving block of a switching unit of a tailgate switching device according to an embodiment of the present invention.

In addition, the switching moving block 310 may further include a constituent element configured to guide an assembly direction. In other words, the switching moving block 310 further includes a plurality of switching moving block assembly guides 316 formed on one side of the outer peripheral surface thereof, and the housing body 120 further includes a plurality of housing body assembly guides 126 formed on one side of the inner peripheral surface thereof to correspond to the positions of the switching moving block assembly guides 316 (see FIGS. 4 and 5). The switching moving block assembly guides 316 and the housing body assembly guides 126 may form a mutual engagement structure in such a manner that the switching moving block assembly guide 316 and the housing body assembly guide 126 are provided in pair so as to be engaged with each other or are disposed asymmetrically so as not to be engaged with each other even when one of them is arranged in a stated of being reversed by 180 degrees, thereby preventing a possibility of an erroneous assembly.

The switching rubber pad 320 is disposed between the switching moving block 310 and the substrate 210. The switching rubber pad 320 includes a pad base 321 and a pad moving part 323. The pad base 321 is disposed between the switching moving block 310 and the substrate 210. The pad moving part 323 is disposed at the central portion of the pad base 321, and is contactable with the switching moving block 310.

In this embodiment, a pad central part 322 is disposed at the center of the pad base 321, and the pad moving part 323 is disposed on one surface of the pad central part 322. At an outer peripheral portion of the pad moving part 323, is formed a region 326 where one end of the substrate pin 220 is disposed or a region 324 where the housing base engagement part 133 is disposed so that interference with other constituent elements can be prevented and watertightness can be ensured.

Figure 9:
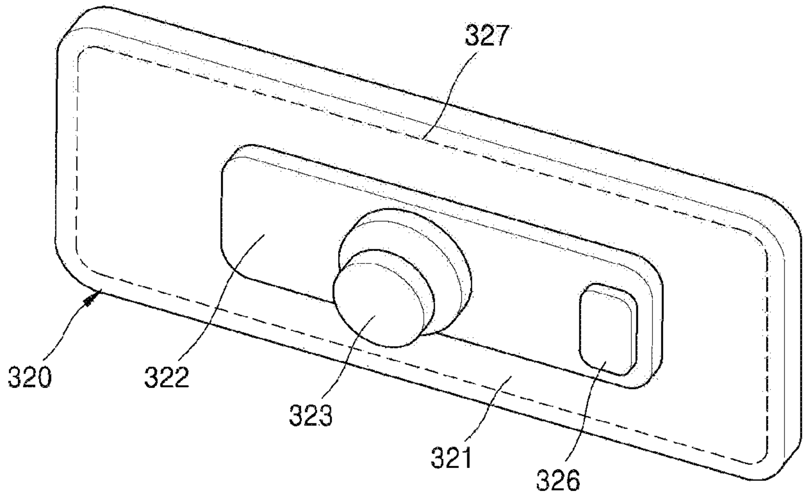
FIG. 9 is a schematic perspective view illustrating a switching rubber pad of a switching unit of a tailgate switching device according to an embodiment of the present invention.
Figure 10:
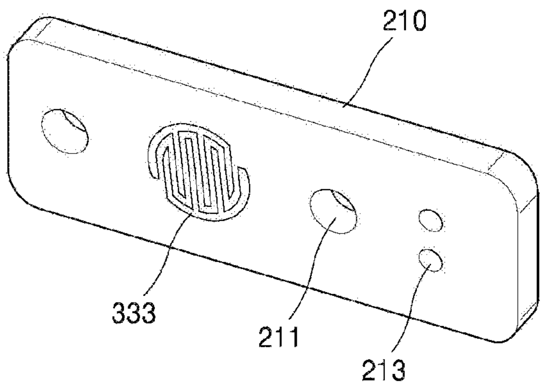
FIG. 10 is a schematic perspective view illustrating a substrate of a substrate unit of a tailgate switching device according to an embodiment of the present invention.
Figure 11:
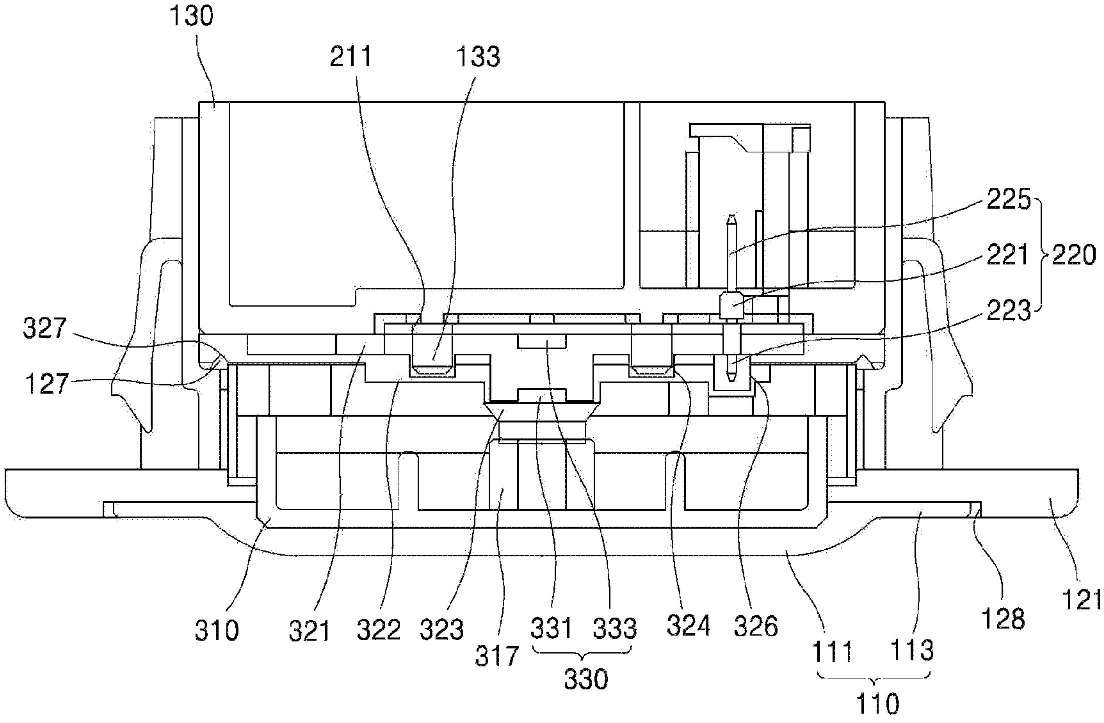
FIG. 11 is a cross-sectional view illustrating a tailgate switching device according to an embodiment of the present invention.
Figure 12:
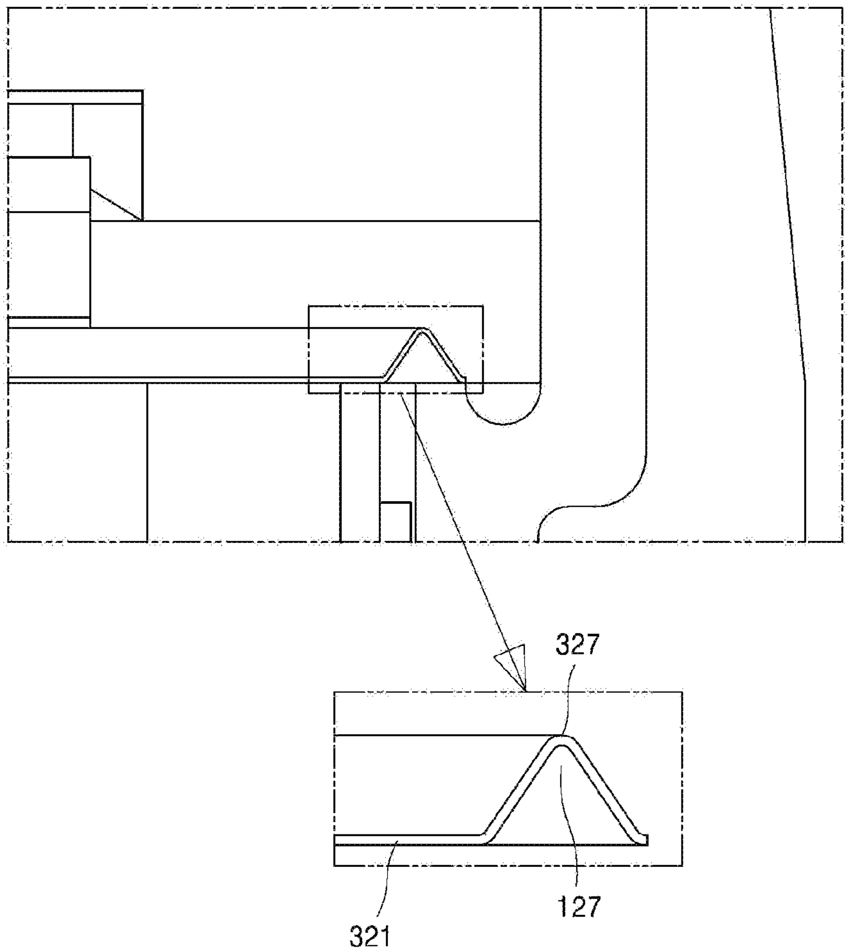
FIG. 12 is a schematic partial cross-sectional view illustrating a tailgate switching device according to an embodiment of the present invention.
Figure 13:
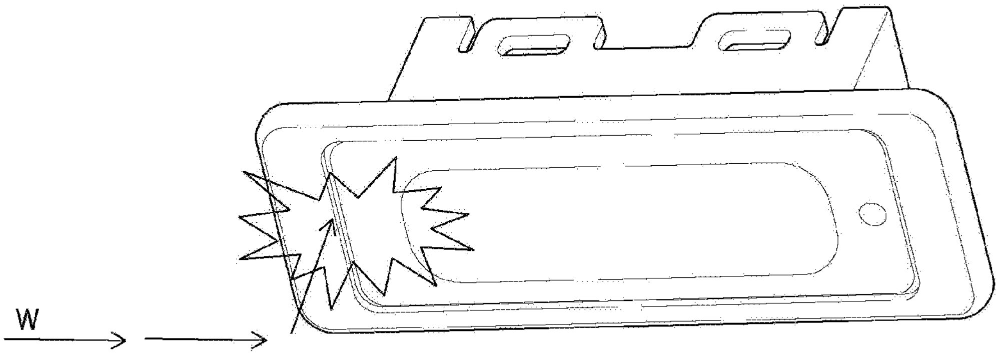
FIG. 13 is a schematic perspective view illustrating a housing with a water inflow preventive structure of a tailgate switching device according to an embodiment of the present invention.

The tailgate switching device 10 according to this embodiment may further include a constituent element for more enhancing watertightness of the tailgate switching device 10. In other words, the housing body 120 may further include a housing body damper 127. The housing body damper 127 is formed to surround the through-opening 122. The housing body damper 127 has a structure of being protrudingly formed toward the switching rubber pad 320 in such a manner that the switching rubber pad 320 is disposed on a corresponding face of the housing body damper 127. In this case, the housing body damper 127 may be included within a surface area of the pad base 3221 when projected onto the pad base 321. In other words, referring to FIGS. 9 and 11, a region where the housing body damper 127 and the pad base 321 come into close contact with each other is denoted by a reference numeral 327. By virtue of a pressing contact structure of the region 327 where the housing body damper 127 and the pad base 321 come into close contact with each other, water can be prevented from being introduced into a region where the substrate 210 is disposed from the outside.

The switching terminal 330 is partially disposed on one surface of the switching rubber pad 320, which is oriented toward the substrate 210, and partially disposed correspondingly so as to be contactable with the substrate 210. The switching terminal 330 includes a movable terminal 331 and a stationary terminal 333. The movable terminal 331 disposed on the switching rubber pad 320. More specifically, the movable terminal 331 disposed on an inner surface of the pad moving part 323 of the switching rubber pad 320. The stationary terminal 333 is disposed on the substrate 210 so as to be contactable with the movable terminal 331.

Figure 14:
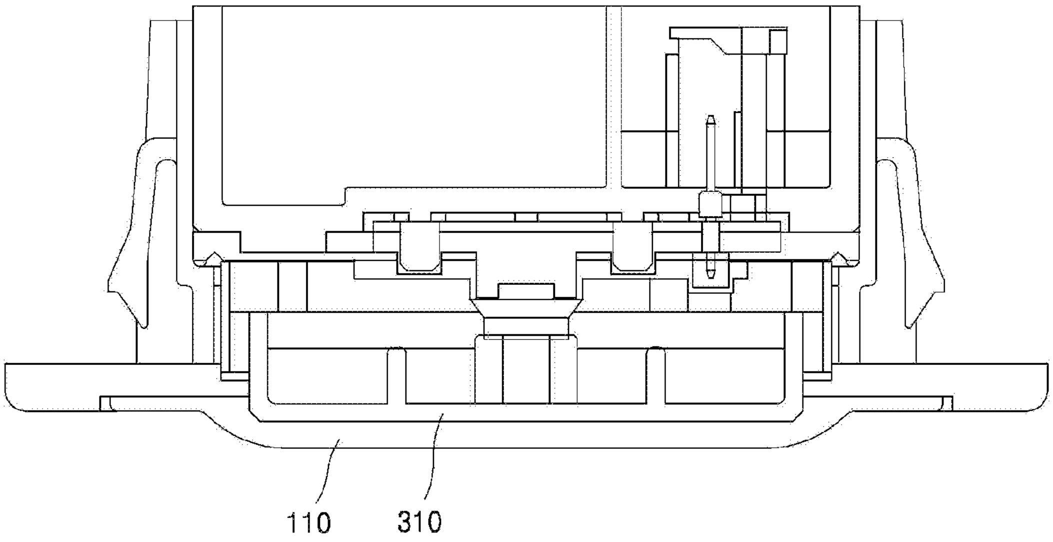
FIGS. 14 to 16 illustrate schematic cross-sectional views of the operation process of a tailgate switching device according to an embodiment of the present invention.
Figure 15:
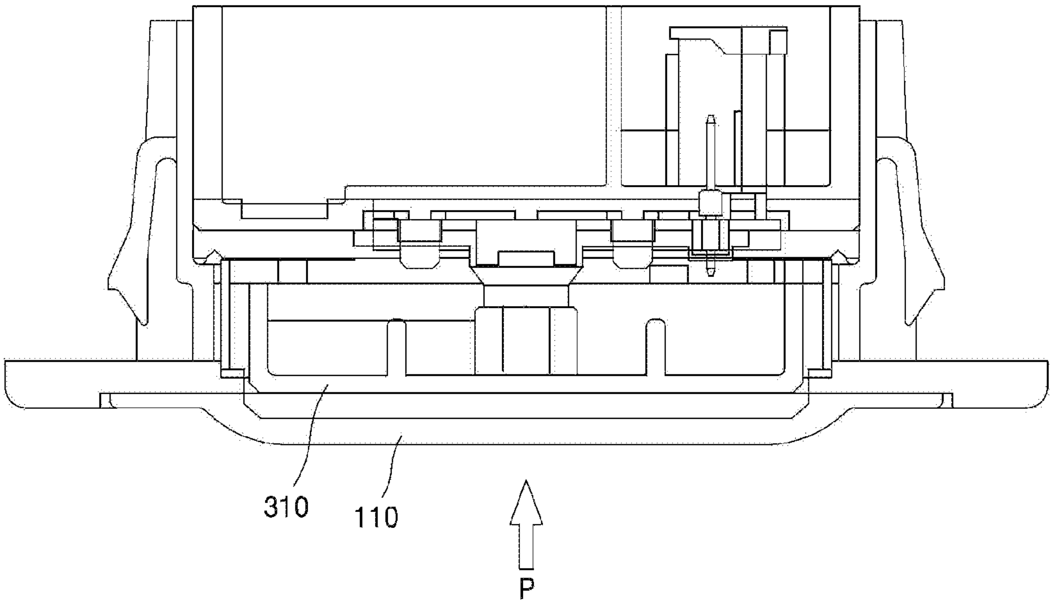
Figure 16:
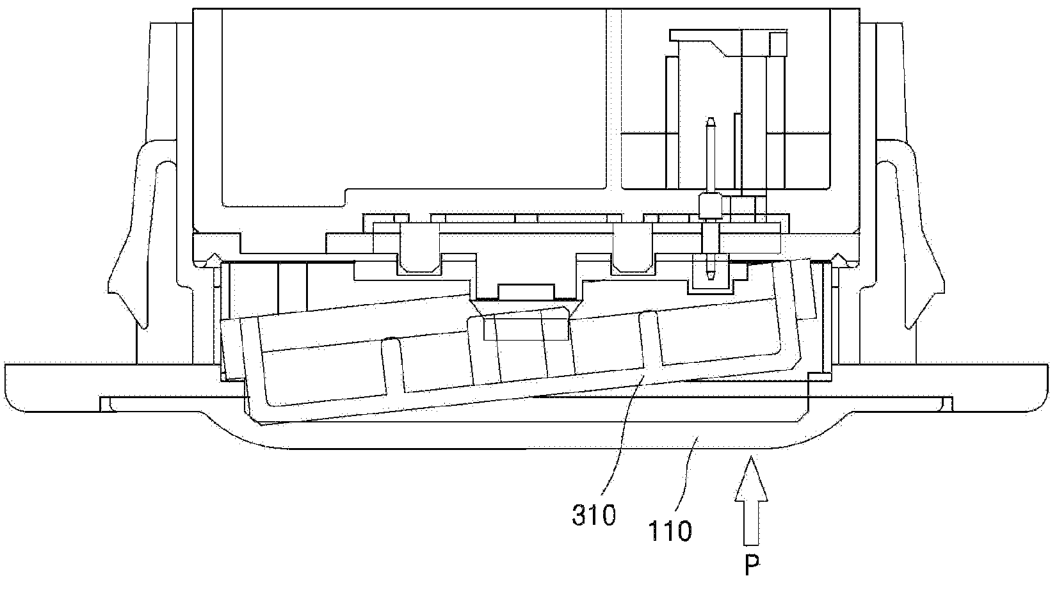

FIGS. 14 to 16 show an operation process of the tailgate switching device 10 according to an embodiment of the present invention. The application of a pressing force is shown in FIGS. 15 and 16, but a returned state of the tailgate switching device 10 is illustrated for the purpose of more clarifying a change in a relative displacement between the housing cover 110 and the switching moving block 310 on the drawing. It is obvious to those skilled in the art that the housing cover 110 on the drawing sheets forms a structure in which it can be deformed or return to its original position by an external force.

First, FIG. 14 illustrates a schematic cross-sectional view of the tailgate switching device in a state in which an external force is not applied by a user. When a driver or user presses the housing cover 110 by exerting a vertical pressing force, the switching moving block 310 disposed within the housing body 120 is moved due to the flexibility of the housing cover 110.

In this case, as shown in FIG. 15, the switching moving block-moving part 317 disposed on the inner surface of the switching moving block 310 moves the pad moving part 323, and the movable terminal 331 disposed on the inner surface of the pad moving pad 323 is contactingly connected to the stationary terminal 333 disposed on one side of the substrate 210 to cause a predetermined change in the electrical signal.

Such a vertical pressing operation may be performed in the manner shown in FIG. 15, but when the user presses one end of the housing cover 110, the housing cover 110 may form a structure in which it is pressed in an inclined state. In this case, even when the pressing operation is performed in the inclined state of the housing cover 110, by virtue of a structure of forming an angle of a movable stroke range of the switching terminal 330 disposed at the central portions of the switching rubber pad 320 and the substrate 220, the tailgate switching device of the present invention may have a structure in which the switching operation by a predetermined pressing operation is completely performed.

While the present invention has been described in connection with the exemplary embodiments illustrated in the drawings, they are merely illustrative and the invention is not limited to these embodiments. It will be appreciated by a person having an ordinary skill in the art that various equivalent modifications and variations of the embodiments can be made without departing from the spirit and scope of the present invention. Therefore, the true technical scope of the present invention should be defined by the technical spirit of the appended claims.

What is claimed is:

1. A tailgate switching device comprising:
- a housing (100) configured to at least partially allow a flexible operation;
- a substrate unit (200) disposed within the housing (100);
- a switching unit (300) including a switching terminal (330) configured to be at least partially movable within the housing (100) through at least partial pressing of the housing (100) and at least partially disposed on the substrate unit (200) to cause a signal change to occur through a relative movement between the switching terminal (330) and the housing (100) and the substrate unit (200); and
- a cable (400) directly connected at one end thereof to the substrate unit (200) and connected at an opposite end thereof to an outside of the housing (100).

2. The tailgate switching device (10) according to claim 1, wherein the substrate unit (200) comprises:
- a substrate (210) disposed within the housing (100); and
- a substrate pin (220) disposed perpendicular to the substrate (210) in such a manner as to pass, at one end thereof, through the housing (100), and
- wherein the cable (400) comprises a cable connector (410) mounted at one end thereof so as to be connectable to one end of the substrate pin (220).

3. The tailgate switching device (10) according to claim 2, wherein the substrate pin (220) comprises:
- a pin base (223) connected to the substrate (210);
- a pin holder (221) configured to support the pin base (223) on one surface of the substrate (210); and
- a pin terminal (225) disposed spaced apart from the pin base (223) with the pin holder (221) interposed between the pin base (223) and the pin terminal (225).

4. The tailgate switching device (10) according to claim 2, wherein the housing (100) comprises:
- a housing body (120) including a through-opening (122) at least partially penetratingly formed at a center thereof;
- a housing base (130) engaged with the housing body (120) to define an internal space between the housing body (120) and the housing base (130); and
- a housing cover (110) made of a flexible material and disposed on the outer surface of the housing body (120) to hermetically seal the through-opening (122) of the housing body (120).

5. The tailgate switching device (10) according to claim 4, wherein the housing cover (110) is disposed to surround a front surface of the housing body (120).

6. The tailgate switching device (10) according to claim 4, wherein the housing cover (110) is disposed to at least partially surround one surface of a housing body plate (121) in such a manner as to include the through-opening (122) of the housing body (120).

7. The tailgate switching device (10) according to claim 4, wherein the housing body 120 comprises a housing body block (123) which comprises a housing body conformation (125) formed at an upper end thereof, which is oriented toward the housing base (130), wherein the housing base (130) comprises a housing base conformation (135) formed on the outer surface thereof so as to correspond to the position of the housing body conformation (125), and wherein when the housing body (120) and the housing base (130) are engaged with each other in a state of being reversed by (180) degrees on a plane where they are disposed to be engaged with each other, a mutual engagement therebetween is prevented.

8. The tailgate switching device (10) according to claim 4, wherein the substrate (210) comprises a substrate mounting part (211) formed therein, and wherein the housing base (130) comprises a housing base engagement part (133) formed therein so as to be engageable with the substrate mounting part (211).

9. The tailgate switching device (10) according to claim 4, wherein the switching unit (300) comprises:

a switching moving block (310) disposed in the internal space of the housing body (120) in such a manner as to be contactable with an inner surface of the housing cover (110);

a switching rubber pad (320) disposed between the switching moving block (310) and the substrate (210); and a switching terminal (330) partially disposed on one surface of the switching rubber pad (320), which is oriented toward the substrate (210), and partially disposed correspondingly so as to be contactable with the substrate (210).

10. The tailgate switching device (10) according to claim 9, wherein the switching terminal (330) comprises:

a movable terminal (331) disposed on the switching rubber pad (320); and a stationary terminal (333) disposed on the substrate (210) so as to be contactable with the movable terminal (331).

11. The tailgate switching device (10) according to claim 9, wherein the switching rubber pad (320) comprises:

a pad base (321) disposed between the switching moving block (310) and the substrate (210); and a pad moving part (323) configured to be contactable with the switching moving block (310).

12. The tailgate switching device (10) according to claim 9, wherein the housing body (120) comprises a housing body damper (127) formed to surround the through-opening (122) and to be protruded toward the switching rubber pad (320).

13. The tailgate switching device (10) according to claim 12, wherein the housing body damper (127) is included within a surface area of the pad base (321) when projected onto the pad base (321).

14. The tailgate switching device (10) according to claim 9, wherein the switching moving block (310) further comprises one or more switching moving block guides (311) formed on an outer peripheral surface thereof, and wherein the housing body (120) further comprises one or more housing body guides (129) formed on the inner peripheral surface thereof to correspond the positions of the switching moving block guides (311) so that the switching moving block guides (311) and the housing body guides (129) are movably engaged with each other.

15. The tailgate switching device (10) according to claim 9, wherein the switching moving block (310) further comprises one or more switching moving block assembly guides (316) formed on one side of an outer peripheral surface thereof, wherein the housing body (120) further comprises one or more housing body assembly guides (126) formed on one side of the inner peripheral surface thereof to correspond to the positions of the switching moving block assembly guides (316) so that the switching moving block assembly guides (316) and the housing body assembly guides (126) are engaged with each other, and wherein the switching moving block assembly guides (316) and the housing body assembly guides (126) form an asymmetrical arrangement structure in which they are not engaged with each other when one of them is arranged in a stated of being reversed by 180 degrees.

16. A tailgate switching device comprising:

a housing (100) configured to at least partially allow a flexible operation, the housing (100) comprising a housing body (120) and a housing cover (110);

a substrate unit (200) disposed within the housing (100), the substrate unit (200) comprising a substrate (210) disposed within the housing (100);

a switching unit (300) including a switching terminal (330) configured to be at least partially movable within the housing (100) through at least partial pressing of the housing (100) and at least partially disposed on the substrate unit (200) to cause a signal change to occur through a relative movement between the switching terminal (330) and the housing (100) and the substrate unit (200); and a cable (400) directly connected at one end thereof to the substrate unit (200) and connected at an opposite end thereof to an outside of the housing (100), wherein the switching unit (300) comprises:

a switching moving block (310) disposed in an internal space of the housing body (120) in such a manner as to be contactable with an inner surface of the housing cover (110);

a switching rubber pad (320) disposed between the switching moving block (310) and the substrate (210); and a switching terminal (330) partially disposed on one surface of the switching rubber pad (320), which is oriented toward the substrate (210), and partially disposed correspondingly so as to be contactable with the substrate (210).

* * * * *